(12) United States Patent
Schantz et al.

(10) Patent No.: US 8,881,400 B2
(45) Date of Patent: Nov. 11, 2014

(54) METHOD FOR PRODUCING THROTTLE HOLES HAVING A LOW CAVITATION TRANSMISSION POINT

(75) Inventors: Stefan Schantz, Zweibruecken (DE); Klaus Seelbach, Kleinbundenbach (DE)

(73) Assignee: Robert Bosch GmbH, Stuttgart (DE)

( * ) Notice: Subject to any disclaimer, the term of this patent is extended or adjusted under 35 U.S.C. 154(b) by 773 days.

(21) Appl. No.: 13/131,139

(22) PCT Filed: Oct. 26, 2009

(86) PCT No.: PCT/EP2009/064068
§ 371 (c)(1),
(2), (4) Date: May 25, 2011

(87) PCT Pub. No.: WO2010/060706
PCT Pub. Date: Jun. 3, 2010

(65) Prior Publication Data
US 2011/0226344 A1 Sep. 22, 2011

(30) Foreign Application Priority Data

Nov. 27, 2008 (DE) .......................... 10 2008 044 096

(51) Int. Cl.
*B21D 51/16* (2006.01)
*F02M 61/16* (2006.01)
*B21K 21/14* (2006.01)
*F16K 25/04* (2006.01)

(52) U.S. Cl.
CPC ......... *F02M 61/168* (2013.01); *F02M 2200/04* (2013.01); *B21K 21/14* (2013.01); *F02M 2200/8069* (2013.01); *F16K 25/04* (2013.01)
USPC ................. 29/890.128; 29/890.12; 137/15.01

(58) Field of Classification Search
USPC ...................... 29/890.12, 890.128; 137/15.01
See application file for complete search history.

(56) References Cited

U.S. PATENT DOCUMENTS

| 5,092,039 | A | * | 3/1992 | Gaskell | 239/533.12 |
| 5,694,903 | A | * | 12/1997 | Ganser | 123/496 |
| 6,826,833 | B1 | * | 12/2004 | Maier et al. | 29/888.44 |
| 8,186,609 | B2 | * | 5/2012 | Rapp et al. | 239/533.3 |
| 2003/0075614 | A1 | * | 4/2003 | Schuerg et al. | 239/102.1 |

(Continued)

FOREIGN PATENT DOCUMENTS

| CN | 1373833 A | 10/2002 |
| CN | 101040115 A | 9/2007 |

(Continued)

OTHER PUBLICATIONS

International Search Report corresponding to PCT Application No. PCT/EP2009/064068, mailed Mar. 11, 2010 (German and English language document) (6 pages).

*Primary Examiner* — Jermie Cozart
*Assistant Examiner* — Ruth G Hidalgo-Hernande
(74) *Attorney, Agent, or Firm* — Maginot, Moore & Beck LLP

(57) ABSTRACT

A method for producing a throttle point, particularly in a channel of a valve piece of a fuel injector is disclosed. The following are performed: first, the outlet channel is created by machining. Then, the throttle point is stamped by a stamping die inserted into a guide hole. The pre-stamped throttle point is electrical-discharge machined in such a way that said throttle point has an electrical-discharge machined inlet area and comprises a stamped outlet area, which lies before a continuous cross-section expansion of the outlet channel as viewed in the flow direction.

12 Claims, 3 Drawing Sheets

(56) References Cited

U.S. PATENT DOCUMENTS

| | | |
|---|---|---|
| 2003/0075622 A1* | 4/2003 | Morita ........................ 239/585.1 |
| 2003/0087487 A1* | 5/2003 | Finke et al. .................... 438/200 |
| 2003/0173430 A1* | 9/2003 | Spencer ..................... 239/585.1 |
| 2003/0192965 A1* | 10/2003 | Maier et al. ................. 239/585.1 |
| 2004/0217214 A1 | 11/2004 | Ricco |
| 2004/0262430 A1 | 12/2004 | Joseph |
| 2005/0273989 A1 | 12/2005 | Dixon et al. |
| 2006/0049286 A1* | 3/2006 | Oomura et al. ................ 239/596 |
| 2007/0057093 A1* | 3/2007 | Gunji et al. .............. 239/533.12 |

FOREIGN PATENT DOCUMENTS

| | | |
|---|---|---|
| DE | 19504882 | 8/1995 |
| DE | 19650865 | 6/1998 |
| DE | 19937961 | 2/2001 |
| DE | 10152173 | 4/2003 |
| DE | 102004049288 | 4/2006 |
| DE | 102007004553 | 7/2008 |
| EP | 0299143 | 1/1989 |
| EP | 1013919 | 6/2000 |
| JP | 2000-505855 A | 5/2000 |
| JP | 2003-139018 A | 5/2003 |
| RU | 2 117 177 C1 | 8/1998 |
| SU | 303804 A1 | 1/1971 |
| SU | 641132 A1 | 1/1979 |
| WO | 0148371 | 7/2001 |
| WO | 02063161 | 8/2002 |

\* cited by examiner

METHOD FOR PRODUCING THROTTLE HOLES HAVING A LOW CAVITATION TRANSMISSION POINT

This application is a 35 U.S.C. §371 National Stage Application of PCT/EP2009/064068, filed Oct. 26, 2009, which claims the benefit of priority to Serial No. DE 10 2008 044 096.5, filed Nov. 27, 2008 in Germany, the disclosures of which are incorporated herein by reference in their entirety.

BACKGROUND

The disclosure proceeds from known ball seat or needle valves for adjusting a throughflow of fluid media. Such valves with a spherical or needle-shaped closing element are used in many fields of technology in which a throughflow of fluid media, such as for example gases or liquids, must be adjusted, for example in the field of hydraulic regulating systems.

An important application example of such ball seat or needle valves can be found in the field of automotive engineering, in particular in the field of injection technology. Such valves are used in numerous injection devices for hydraulic pressure regulation and/or control of the injection behavior of such systems. In particular in the field of high-pressure accumulator injection systems (common rail system), these valves are used to control the stroke of an injection valve member which opens or closes injection openings. Examples of such devices are specified in DE 101 52 173 A1 and DE 196 50 865 A1. Here, a control chamber which directly or indirectly influences the stroke of the injection valve member is connected to the valve directly or via a further bore via an inlet. Aside from the closing element, the valve has an actuator which presses the closing element into a valve seat or raises the closing element from said valve seat in order to separate the control chamber from a relief chamber, or connect said control chamber to the relief chamber.

As presented for example in DE 101 52 173 A1, valves for adjusting throughflow known from the prior art generally have a prethrottle on that side of the inlet which faces toward the control chamber. Said prethrottle is adjoined in the direction of the valve by one or more widenings of the inlet, which may take different forms. The flow through the prethrottle is generally configured so as to be lower than the volume flow which passes between the valve seat and the closing element when the ball seat valve or needle valve is fully open. As a result of the prethrottle, the throughflow is substantially independent of the closing element stroke tolerance to be set.

In practice, however, conventional valves known from the prior art which have a spherical or needle-shaped closing element have the disadvantage of intense erosion. If there is a large pressure gradient between the entry and exit of a throttle bore, such as is often the case in throttle bores in high-pressure injection valves which operate with pressures of up to 3500 bar, the medium accelerates in the throttle bore so intensely that the pressure falls to approximately 0 bar, and cavitation bubbles form. To prevent said cavitation bubbles from imploding on the surface of a component, or even on the valve seat, and thereby damaging the surface, it has proven to be advantageous for a large amount of the cavitation bubbles to be converted in a controlled manner into liquid phase by means of a second prethrottle, and for damage to functionally critical components to thereby be prevented, as described in DE 10 2007 004 553 A1.

The flow speed of the medium increases intensely in the inlet region of a throttle bore. At the same time, the pressure in the medium falls. If the pressure falls to the vapor pressure of the medium, cavitation bubbles form. Since the pressure can fall no further below the vapor pressure of the medium, the mass flow through the throttle bore remains constant after the vapor pressure is reached. The vapor-filled cavitation bubbles take up a larger volume than the liquid medium. This results in a pressure recovery in the onward flow through the throttle bore. The pressure recovery is further intensified by the contact of the flow against the throttle wall. In throttles with relatively high pressure recovery, a higher back pressure can be applied downstream of the throttle before flow no longer passes in a cavitating manner through the throttle. The greater the pressure recovery, the more independent the throttle is of the conditions downstream of the throttle.

To make throttle bores as insensitive to pressure fluctuations and geometric influences as possible, a cavitating throughflow is desirable. Ideally, the cavitation transition point should lie as close as possible to the start of the throttle, because the attainable pressure recovery is greater and therefore the tendency for a cavitating flow through the throttle increases. In contrast, if the cavitation transition point is situated at the end of the throttle bore in the region of the throttle outlet, the pressure recovery can take place only in a diffuser bore. Since the latter however has a relatively large cross section, the attainable pressure recovery is lower. If the throttle duct widens slowly in the flow direction, then the cavitation transition point lies at the start of the throttle, because the narrowest cross section of the throttle duct lies in the vicinity of the throttle inlet.

Throttle bores which are presented in the fuel injectors according to the prior art may be produced for example by means of cutting production processes such as drilling. It is however also possible for throttle bores to be produced by erosion. In the case of erosion, as a result of the more intense burn-off of the electrode at the tip, a throttle bore is generated which tapers slowly in the erosion direction. The tapering of the throttle bore in the erosion direction takes place on the micrometer scale. An eroded throttle can accordingly have the cavitation transition point in the region of the inlet only if flow passes through said throttle counter to the erosion direction. In contrast, if erosion counter to the throughflow direction is not possible or uneconomical or if there are other reasons against this, a throttle duct is formed which tapers slowly in the throughflow direction. As a result, a cavitation transition point is generated a short distance upstream of the throttle outlet, which leads to the abovementioned reduced maximum attainable pressure recovery.

To produce a throttle bore which, contrary to the "natural" erosion process, widens slowly in the erosion direction, the approach at present is to set the component to be eroded in a tumbling motion such that the origin of the tumbling motion is situated in the vicinity of the throttle inlet. This hitherto practiced method is however associated with the disadvantage that small throttle throughflow tolerances can be realized only with difficulty.

SUMMARY

The present disclosure describes a method for producing a throttle point, by means of which method it is possible to produce a throttle bore which has a cavitation transition point from non-cavitating to cavitating throughflow as close as possible to the throttle inlet, and which can be produced by means of erosion even in the flow direction.

In the solution proposed according to the disclosure, a throttle bore which has the advantages of a cavitation transition point from non-cavitating to cavitating throughflow and which widens in the throughflow direction is produced by impressing a diffuser bore in the soft state. Hardening of the component obtained in this way is subsequently carried out. In the case of a throttle bore which widens in the flow direction, the entry region of the throttle determines the throughflow. The diameter is therefore produced very precisely in said region. The length of the inlet region is preferably between one and two times the throttle diameter. The inlet region of the throttle bore may be cylindrical or may widen on the micrometer scale in the flow direction. The outlet region of the throttle bore has no influence on the throughflow, but determines the level of the possible pressure recovery. The outlet region must have a greater diameter than the inlet region of the throttle bore and widen on the micrometer scale in the flow direction. While the inlet region of the throttle bore is preferably produced by means of an erosion process after the hardening of the component, the outlet region of the throttle is generated by means of an impressing process in the soft state.

After a first cutting machining process, an already existing diffuser bore is reduced in diameter by impressing to such an extent that the smallest cross section is slightly smaller than the throttle diameter to be produced later by an erosion process. Here, a throttle form is generated which is similar to a de Laval nozzle. Subsequently, that tapering region of the throttle bore which corresponds to the inlet region of a de Laval nozzle, and which is detrimental to a cavitating flow through the throttle bore, is replaced by the formation of a pre-hole, preferably by means of drilling. Here, as sharp-edged a transition as possible is formed between the pre-hole and the throttle bore. After the hardening of the component, a precisely defined throttle diameter is then produced by means of an erosion process. Here, the electrode is advantageously adapted to the funnel shape generated during the impressing process.

The method proposed according to the disclosure for producing a throttle bore is characterized in particular in that the impressing punch is self-centered in a guide bore which delimits the control chamber and in which the injection valve member is mounted. In the method proposed according to the disclosure, standard erosion processes can be used to produce the throttle bore contour. The impressing process can be integrated into the already provided process step of cutting production.

A cavitation transition point in the throttle inlet region of a throttle bore can be attained by means of the sharp-edged transition between the pre-hole and the throttle bore and also a minimum throttle bore length, which is dependent on the throttle diameter at the throttle point. Furthermore, a cavitation transition point in the throttle inlet region is promoted by means of a throttle cross section which slowly increases in size in the flow direction through the throttle bore.

The method proposed according to the disclosure for producing the throttle bore with a cavitation transition point in the throttle inlet region can be applied to throttle bores in fuel injectors of all fuel injection systems for auto-ignition internal combustion engines in which erosion of the throttle bore in the valve piece counter to the flow direction is not possible, or a conical contour of the throttle should be more accentuated.

BRIEF DESCRIPTION OF THE DRAWINGS

The disclosure will be described in more detail below on the basis of the drawing, in which.

DETAILED DESCRIPTION

Figure 1:
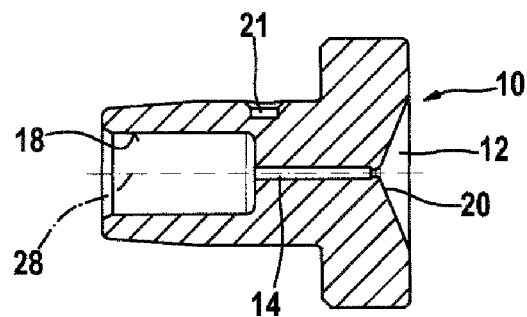
FIG. 1 shows an illustration of a component in which an outlet duct runs, at the preliminary turning stage.

FIG. 1 shows a component, in particular a valve piece of a fuel injector, in which a duct for discharging a pressurized medium is formed.

The component 10 illustrated in FIG. 1 is in particular the valve piece of a fuel injector in which a control chamber is situated. The control chamber is charged by a pressurized medium, in particular fuel at system pressure. The system pressure of the fuel is generated for example in a high-pressure accumulator body (common rail) of a high-pressure accumulator injection system by means of a high-pressure pump which acts on the high-pressure accumulator body (common rail). An inlet throttle 22 will be produced subsequently at a counterbore 21 (cf. illustration of FIG. 3), through which inlet throttle the medium at system pressure, such as for example fuel, flows into the control chamber (cf. FIG. 3).

A release of pressure from the control chamber formed in the valve piece 10 takes place through a duct, in particular an outflow duct 14. The duct which runs in the valve piece 10 opens out at a valve seat 20 which is formed in a funnel 12 on a planar side of the valve piece 10. A spherical or needle-shaped closing element (not illustrated here) is held in the valve seat 20, which closing element closes off the outlet duct 14 in the closed state and, for a release of pressure from the control chamber (cf. FIGS. 3 and 6), opens said outlet duct 14 under the action of a solenoid valve or a piezoelectric actuator or the like.

In FIG. 1, the component 10, which is in particular a valve piece, is provided with a guide bore 18 which adjoins the control chamber, and said component 10 is illustrated at the preliminary turning stage before the impressing process.

Figure 2:
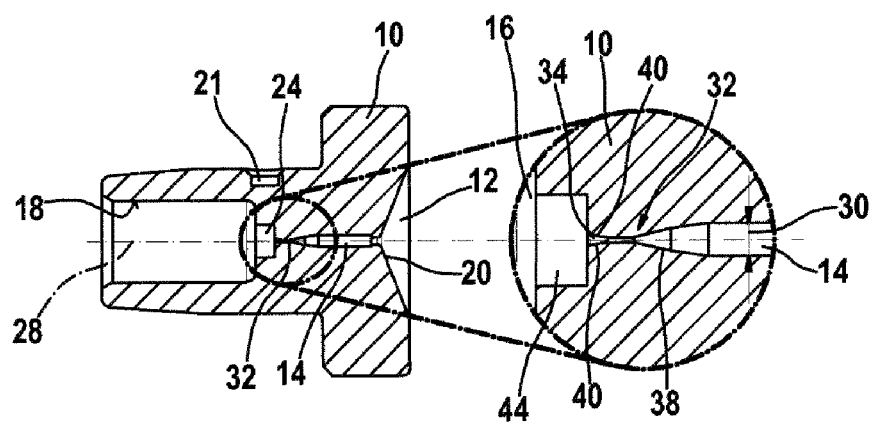
FIG. 2 shows the component illustrated at the preliminary turning stage in FIG. 1 with an impressing punch impression.

In the illustration of FIG. 2, the component, which is preferably designed as a valve piece, according to FIG. 1 is illustrated at a further machining stage.

FIG. 2 shows that the component 10, which is designed as a valve piece, has the guide bore 18 which extends to the control chamber 16 symmetrically with respect to the axis of symmetry 28. The guide bore 18 serves to center and guide an impressing punch. The impressing punch has an impressing head on the end side. The impressing punch centered in the guide bore 18 of the valve piece 10 can be inserted, in conjunction with the cutting turning machining process during which the outlet duct 14 is produced in the valve piece 10, into the guide bore 18, and said impressing punch deforms the end-side delimiting wall of the guide bore 18 through which the outlet duct 14 extends, as illustrated in FIG. 2. The impressing of the throttle point 32 is carried out preferably in the soft state of the valve piece 10, that is to say at a time at which the surface of said valve piece has not yet been hardened. As a result of the introduction of the impressing punch into the guide bore 18, upsetting 40 of the material of the valve piece 10 occurs in the region of the outlet duct 14, and a throttle point 32 is formed by upset material 40. In the upset material 40, a residual cross section remains which is slightly smaller than the throttle diameter 54 produced in a highly precise manner at a later time. On account of the contour impressed uniformly in the material of the component 10, that is to say formed in the material of the valve piece 10, a throttle point 32 is produced which is adjoined, as viewed in the axial direction, by a continuous cross-sectional widening 38 of the outlet duct 14. The outlet duct 14 opens out—as illustrated in FIG. 2—at the valve seat 20 in the funnel 12 of the valve piece 10. A seat throttle 50 in the outlet duct 14 has the effect that some of the cavitation bubbles in particular in the edge region condense, thereby preventing the cavitation bubbles from destroying the valve seat formed in the valve piece 10. The seat throttle 50 is situated in the outlet duct 14 directly upstream of the opening-out point in the valve seat 20. As illustrated in FIG. 2, the insertion of the impressing punch into the guide bore 18 permits self-centering of the impressing punch during the impressing process.

Figure 3:
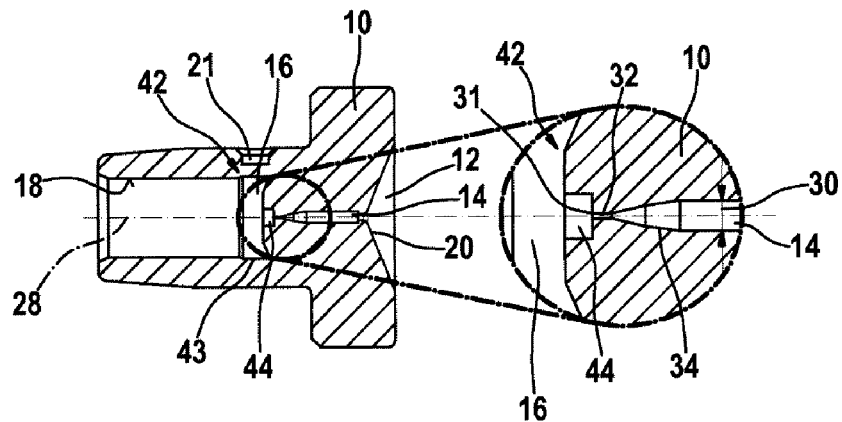
FIG. 3 shows the removal of the impressing punch impression by cutting, and the production of a pre-hole with a sharp-edged transition to the throttle bore.

FIG. 3 shows subsequent cutting machining of the valve piece to form the control chamber.

As illustrated in FIG. 2, during the impressing process, a throttle point contour is formed which is similar to that of a de Laval nozzle. Said contour which is similar to that of a de Laval nozzle has both a rounded inlet region and also a rounded outlet region. The inlet region with its rounded edges is unfavorable for the formation of a cavitating flow of the medium through the throttle point. A sharp-edged throttle inlet is in fact required. For this reason, the impressing punch impression is completely removed, which is preferably achieved by means of a cutting machining process. The pre-hole 44 is situated at the point where the inlet region, which was detrimental to a cavitating throughflow, of the impressed contour was situated before the cutting machining process, and said pre-hole forms a sharp-edged transition to the throttle point 32.

The illustration of FIG. 3 shows that the impressed contour is produced on account of the upset material 40. The upset material 40, with its side adjoining the outlet duct 14 in the valve piece 10, delimits the throttle point 32 in the outlet duct 14. Since the impressing punch is centered in the guide bore 18 of the valve piece 10, as in the illustration of FIG. 2, the deformation of the material of the valve piece 10 to form the throttle point 32 is introduced symmetrically into the valve piece 10, that is to say the upsetting 40 of the material of the valve piece 10 runs symmetrically with respect to the axis of symmetry of the valve piece 10. At the subsequent cutting machining stage, the control chamber 16 is turned out of the valve piece 10 in the region in which the impressing punch impression was situated in the machining step according to FIG. 2. During the cutting machining process according to FIG. 3, firstly the control chamber 16 is formed adjacent to the inlet throttle 22 and secondly a pre-hole 44 which constitutes a sharp-edged throttle inlet is produced. Said pre-hole 44 is situated at the entry side of the throttle point 32. The cavitation transition point is situated in the entry region of the throttle point 32 and is generated during the erosion process. The throttle point 32 is formed as a result of the upsetting of the material 40.

The sharp-edged pre-hole 44 according to the illustration in FIG. 3 is situated between the control chamber 16 and an inlet 31 into the throttle point 32.

Figure 4:
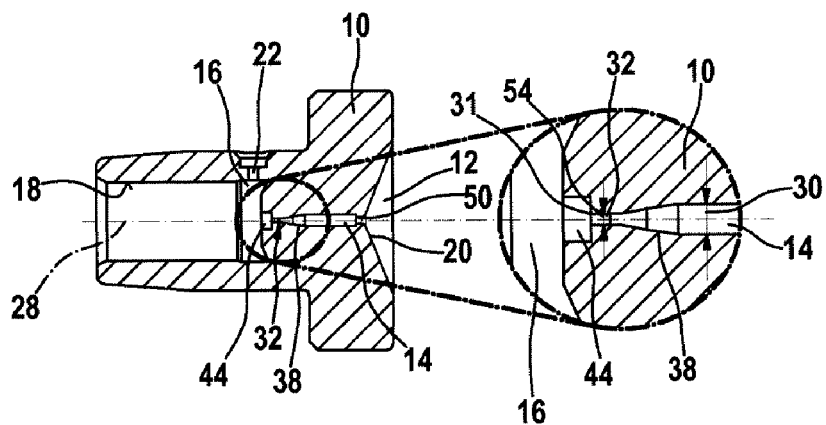
FIG. 4 shows the eroded hard stage with final, highly precisely set throttle diameter.

The illustration of FIG. 4 shows the eroded hard stage of the valve piece.

Erosion is subsequently carried out, as a result of which the defined diameter 54 which determines the throughflow is produced in a highly precise manner at the throttle point 32. During the erosion of the valve piece 10, a throttle point 32 with a very precise diameter 54 is finally formed which opens out into a slowly widening outlet region (cf. position 38) generated during the impressing process. The smallest residual cross section generated during the impressing process should advantageously be set so as to be slightly smaller than the throttle diameter generated during the erosion process. This provides as smooth a transition as possible between the eroded contour and the impressed contour. During the erosion of the valve piece 10, a throttle point 32 is formed which widens in the erosion direction and which merges into the continuous cross-sectional widening 38, which has an extremely favorable influence on the throughflow characteristics of the throttle point 32 produced according to the disclosure in the outlet duct 14. The erosion electrode used for the erosion process, that is to say for producing the final throttle diameter 54, is advantageously adapted to the contour of the throttle point 32 previously formed during the impressing process. In this way, it is possible to realize extremely short cycle times within the erosion process.

Before the erosion process, which preferably takes place in an erosion direction which is the same as the flow direction through the throttle point 32 in the outlet duct 14 to the valve seat 20, hardening of the valve piece 10 is carried out. The desired precisely well-defined throttle diameter 54 of the throttle point 32, that is to say the fine adjustment of the throttle cross section and the throttle action attained as a result, is set by means of the erosion process and subsequent hydroerosive rounding.

By means of the above-illustrated machining process for producing a throttle point 32 in the outlet duct 14 of a valve piece 10, it is possible to obtain a cavitation transition point at the throttle inlet region, which generates a transition from non-cavitating throughflow to cavitating throughflow with a relatively high back pressure. In this way, the throttle point 32 is insensitive with regard to pressure and geometrical influences.

As shown in FIGS. 2, 3 and 4, the continuously widening cross-sectional widening 38 which is advantageous for the cavitating flow through the throttle point 32 can be obtained by virtue of the erosion electrode used for the finish machining of the throttle point 32 being adapted to the impressed contour already provided by the impressing process, that is to say a de Laval nozzle contour or a funnel shape downstream of the throttle point 32. In this way, it is advantageously obtained that the cavitation transition point lies in the inlet region of the throttle point 32. The length of the subsequently eroded throttle bore is of particular significance. The inlet region of the throttle bore may be cylindrical or may widen on the micrometer scale in the flow direction. The outlet region of the throttle bore has no influence on the throughflow, but determines the level of the possible pressure recovery. The outlet region must have a greater diameter than the inlet region of the throttle bore, and widen on the micrometer scale in the flow direction.

The illustrated manufacturing process for producing a throttle point 32 with a cavitation transition point in the throttle inlet region may be implemented for throttle points 32 which are used in outlet ducts 14 for control chambers 16 for actuating fuel injectors, and in which erosion of the throttle point 32 counter to the flow direction is not possible.

In the case of injection nozzles at the combustion-chamber-side end of fuel injectors, the conicity of the injection openings which open into the combustion chamber can be described by the K factor, that is to say the conicity factor. With increasing K factor, the cross section of the injection opening tapers to an increasing extent in the flow direction. In the case of injection openings, the conicity thereof is utilized to delay the cavitation time and thereby increase the jet penetration depth during the injection of fuel into the combustion chamber of the internal combustion engine. The above-described impressing process can also be taken into consideration for producing conically running injection openings more cost-effectively.

Figure 5:
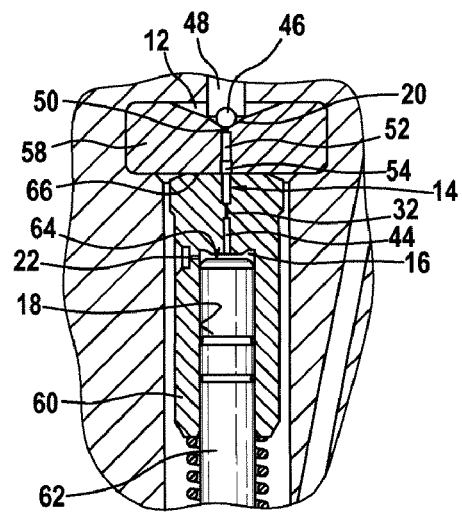
FIG. 5 shows an embodiment of an outlet duct which extends through two components, a throttle plate and a guide body.

FIG. 5 shows an outlet duct, running through two mutually separate components, for the release of pressure from a control chamber.

FIG. 5 shows that, along a contact surface 66, a throttle point 58 is connected to a guide body 60. The injection valve member 62 which is preferably of needle-shaped design is guided in the guide bore 18 in the guide body 60. The planar side 64 of said injection valve member 62 delimits the control chamber 16, which in turn is charged with fuel at system pressure via the inlet throttle 22. The outlet duct 14 which extends from the control chamber 16 in the guide body 60 to the valve seat 20 in the throttle plate 58 comprises the pre-hole 44 and the throttle point 32, which adjoins said pre-hole 44 as viewed in the throughflow direction. The throttle point 32 merges—as viewed in the throughflow direction—into a diffuser 52, which in turn opens out in a seat throttle 50 provided below the valve seat 20. The valve seat 20 according to the embodiment in FIG. 5 is closed off by a spherical or conical closing element 46 which is held in a closing element receptacle 58. The closing element receptacle 58 may be formed on the underside of an armature pin which can be actuated by means of a solenoid valve or a piezoelectric actuator.

In the embodiment illustrated in FIG. 5, the outlet duct 14 runs through two separate components, that is to say the throttle plate 58 and the guide bore 60. The outlet duct 14 is produced in the throttle plate 58 by means of cutting process steps, and in the guide body 60 likewise by cutting machining. A disadvantage here is that two components are required, and therefore production is more expensive overall, and an additional sealing surface is formed. The impressing process is not used here, such that the valve piece illustrated in FIG. 5 comprises two components, that is to say the throttle plate 58 and the guide body 60.

Figure 6:
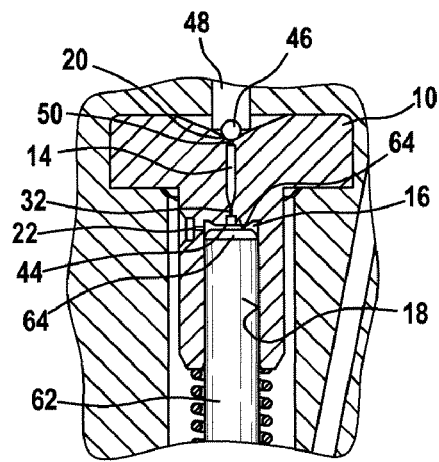
FIG. 6 shows the illustration of a component which is designed in particular as a valve piece and in which the throttle point produced according to the disclosure is formed.

In contrast, FIG. 6 shows a throttle point produced in the outlet duct 14 by means of the method proposed according to the disclosure.

As shown in FIG. 6, in contrast to the illustration of FIG. 5, the valve piece 10 is formed in one piece, that is to say the throttle plate 58 and the guide body 60 for guiding the preferably needle-shaped injection valve member 62 form one component.

The needle-shaped injection valve 62 is guided in the guide bore 18 of the valve piece 10 and, by means of its planar side 64, delimits the control chamber 16. The control chamber 16 is in turn charged with fuel at system pressure through the inlet throttle 22. The release of pressure from the control chamber 16 takes place in the outlet duct 14, with the pre-hole 44 serving as an admission chamber of the throttle duct 14 and the throttle point 32 contained therein. The sharp-edged transition 44 is formed by the edge between the pre-hole 44 and the throttle. The sharp-edged transition 44 (pre-hole) is situated upstream of the throttle point 32 in the flow direction through the outlet duct 14. As shown in the illustrations of FIGS. 1-4, said throttle point 32 is produced by means of cutting process steps and by means of impressing. The diameter constriction 34, 54 of the outlet duct 14, which forms the actual throttle point 32, is realized by means of upset material 40 which, during the impressing process, delimits the throughflow cross section of the outlet duct 14 at the throttle point 32. According to the machining steps illustrated in FIGS. 1-4, the throttle point 32 comprises firstly the eroded inlet region and secondly the impressed outlet region which, in the throughflow direction of the medium to be conducted to the valve seat 20, lies upstream of the continuous cross-sectional widening 38.

The continuous cross-sectional widening 38 of the outlet duct 14 merges into a seat throttle 50, also referred to as a prethrottle, below the valve seat 20 which, in the illustration of FIG. 6, is closed off by the closing element 46, which is of spherical design here. The closing element 46 is guided in a closing element receptacle 48 which in turn is actuated by means of a solenoid valve or by means of a piezoelectric actuator, to name two examples. During the opening of the valve seat 20, the closing element 46 is raised out of the valve seat 20, such that via the seat throttle 50 arranged below the valve seat 20, a control quantity can be discharged out of the control chamber 16 via the outlet duct 14 with throttle point 32 integrated therein.

The invention claimed is:

1. A method for producing a throttle point in a duct for discharging a medium out of a chamber through which an injection valve member of a fuel injector is actuated, comprising:
   a) producing the duct in a valve piece,
   b) generating a contour in the duct by impressing the throttle point, the contour extending from an inlet defined in the duct to a continuous cross-sectional widening within the duct,
   c) generating a sharp-edged transition upstream of the throttle point, and
   d) producing a defined diameter by erosion at the throttle point, and maintaining an impressed outlet region upstream from the continuous cross-sectional widening.

2. The method as claimed in claim 1, wherein the contour is generated by use of an impressing punch in a soft state of the valve piece, the impressing punch being centered in a guide bore formed in the valve piece.

3. The method as claimed in claim 2, wherein the material of the valve piece undergoes upsetting as a result of the impressing, and said upsetting defines the contour of the duct downstream of the throttle point.

4. The method as claimed in claim 1, wherein the valve piece is hardened after the contour is generated and before the sharp-edged transition is generated.

5. The method as claimed in claim 1, wherein the exact throttle diameter of the throttle point in the duct is set by the erosion taking place in a throughflow direction of the duct.

6. The method as claimed in claim 1, wherein the erosion is carried out in an erosion direction that coincides with a throughflow direction in which the medium flows through the throttle point.

7. The method as claimed in claim 5, further comprising finish machining the impressed contour, the finish machining including hydro erosive rounding of the impressed contour of the throttle point is carried out during the course of finish machining.

8. The method as claimed in claim 1, wherein the contour is generated during a soft machining stage of the valve piece and during cutting machining thereof.

9. The method as claimed in claim 1, wherein the erosion is carried out with an erosion electrode in an erosion direction, the erosion electrode being configured with a contour predefined by the impressed contour of the throttle point, for finish machining of the impressed contour.

10. The method as claimed in claim 1, further comprising forming an injection opening for fuel which has a conicity, the injection opening being configured to be formed so as to increase the jet penetration depth into the combustion chamber.

11. The method as claimed in claim 8, wherein the cutting machining includes turning machining.

12. The method as claimed in claim 9, wherein the erosion electrode is configured with a funnel-shaped contour.

* * * * *